Figure 1:
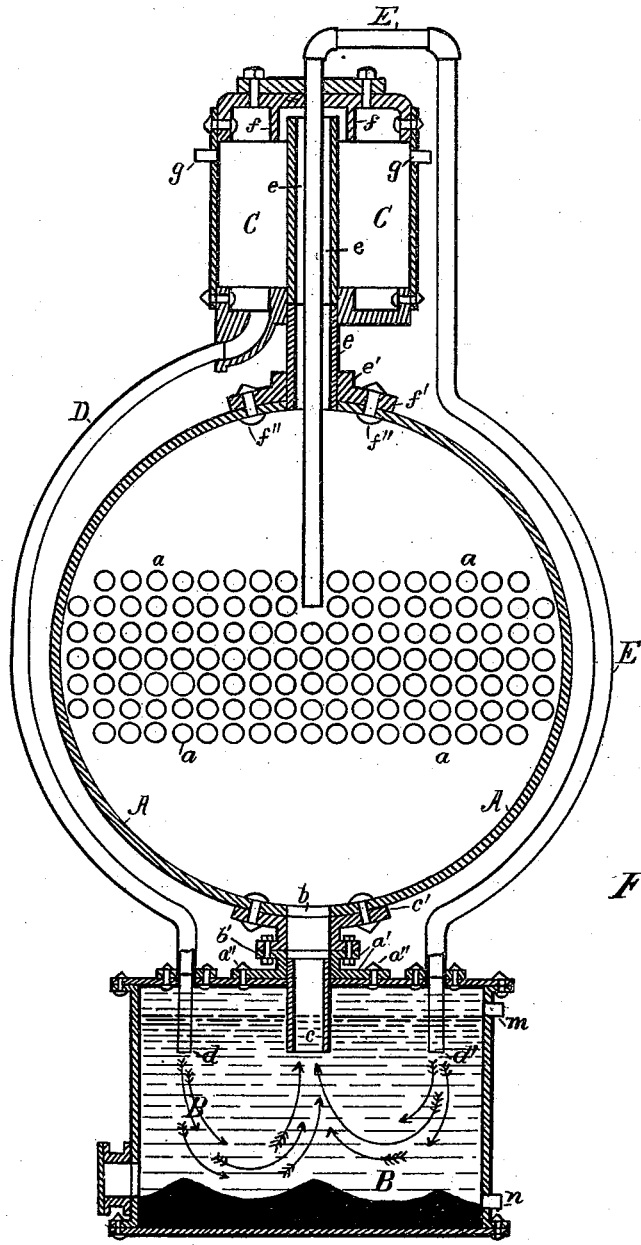

(No Model.) 2 Sheets—Sheet 1.

E. S. TITUS & F. W. WERNER.
FEED WATER PURIFIER.

No. 447,018. Patented Feb. 24, 1891.

WITNESSES:
Charles A. Herbert
Ernest E. Bache

INVENTORS
Edward S. Titus
Frederick W. Werner
By James A. Whitney
ATTORNEY (No Model.) 2 Sheets—Sheet 2.

E. S. TITUS & F. W. WERNER.
FEED WATER PURIFIER.

No. 447,018. Patented Feb. 24, 1891.

WITNESSES:
Charles A. Herbert
Ernest C. Bache

INVENTORS
Edward S. Titus
Frederick W. Werner
By James A. Whitney
ATTORNEY

UNITED STATES PATENT OFFICE.

EDWARD S. TITUS AND FREDERICK W. WERNER, OF HEMPSTEAD, NEW YORK.

FEED-WATER PURIFIER.

SPECIFICATION forming part of Letters Patent No. 447,018, dated February 24, 1891.

Application filed October 7, 1890. Serial No. 367,374. (No model.)

*To all whom it may concern:*

Be it known that we, EDWARD S. TITUS and FREDERICK W. WERNER, both of Hempstead, in the county of Queens and State of New York, have invented certain new and useful Improvements in Feed-Water Purifiers; and we do hereby declare that the following is a full, clear, and exact description of the invention, which will enable others skilled in the art to which it appertains to make and use the same.

This invention comprises a feed-water apparatus in which the water is purified from impurities which are injurious to steam-boilers previous to the passage of the feed-water into the evaporation or steam generating portion of the boiler, by which means the danger and inconvenience resulting from the use of water containing mineral substances in solution are avoided. The purifier performs a double function. The carbonate of lime, carbonate of magnesia, sulphate of lime, mud, and all the foreign matter, mineral or otherwise, which is dissolved or held in solution in the feed-water heavy enough to sink in the gentle currents which are always maintained in the separator when the boiler is over fire, are precipitated on the bottom of the separating-tank of our purifier, where it can be drawn off at convenience. All the scum or light particles of matter, as oil, &c., which naturally float on the surface of water, will rise into the top of the separating tank or chamber, there to be drawn off at will.

It is a law of physics well known and understood that the most troublesome and dangerous ingredients contained in feed-water can only be precipitated or eliminated from the water at a very high temperature. One of the most important functions of our purifiers is the heating of the feed-water to the highest attainable point before entering the separating-chamber of the purifier. This degree of heat is approximately equal to the normal temperature of water in the boiler—that is, to the temperature due to the pressure carried in the boiler; in short, an equilibrium of temperature in the boiler and separating-chamber of the purifier, making slight allowance for loss of heat from contact with the water of the circulating-pipes and connecting-chambers.

In locomotive practice the boiler-pressure ranges from one hundred and twenty to one hundred and eighty pounds. The water temperature at such a pressure is 350° to 380° Fahrenheit. Our aim is to heat the water in the purifier before it reaches the separating-chamber to or very near this temperature, thus compelling the precipitation of all mineral or solid matter to the bottom of the separating-tank or separator, where it can be conveniently drawn off, this precipitation being fully accomplished before the feed-water enters the boiler.

Figure 2:
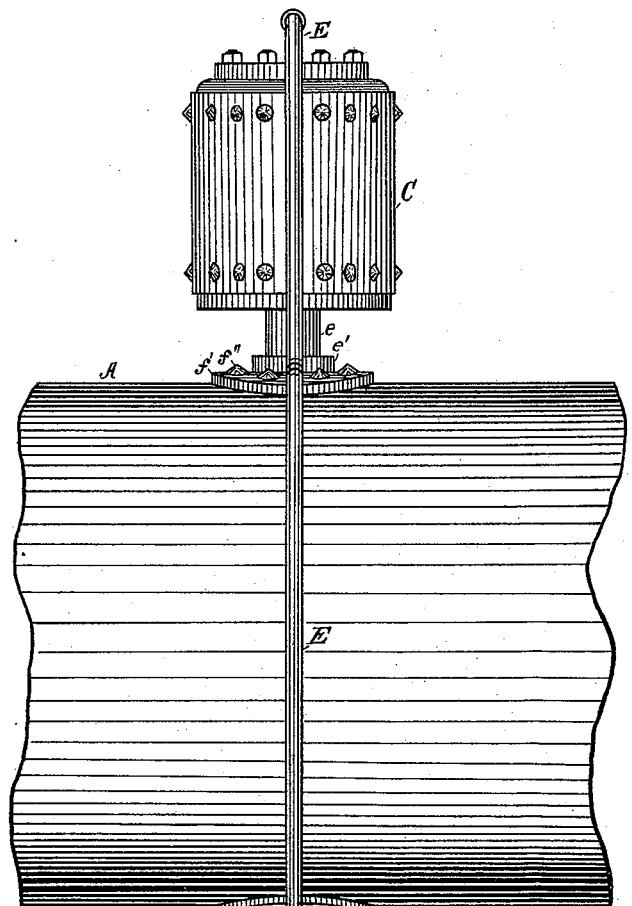
Figure 3:
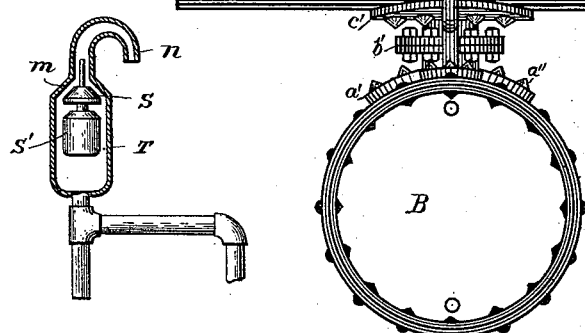

Figure 1 is a vertical transverse sectional view representing our said invention, and Fig. 2 is a side view of the same. Fig. 3 is a vertical detail sectional view of an air-outlet valve at the top of the circulation-pipe E.

This invention is more especially designed for use in locomotive-boilers, but may also be employed in stationary boilers of any suitable type or construction.

A is the shell of the boiler, $a$ $a$ indicating the tubes. This boiler may be of any suitable construction; as, for example, a flue-boiler may be used instead of one with tubes. Placed below the shell A of the boiler is a tank B, which connects by a passage $b$ with the interior of the shell A—in other words, with the boiler in connection with which the apparatus is employed. Extending downward from this passage $b$ is a tube $c$. The lower end of the tube $c$ projects down into the tank, as shown in the drawings, for a purpose hereinafter described. The tank or separating-chamber B, being thus in communication with the boiler, forms, so to speak, a part of the latter, with this qualification that the water within the boiler is that which is subjected to evaporation for the production of steam, while that in the tank or chamber B is undergoing the elimination of its mineral impurities.

Placed at the top of the boiler is a chamber C. Extending upward from the boiler through this chamber and nearly to the top thereof is a tube, which provides a passage $e$. Extending downward from the top of the chamber C, at a suitable distance from the outer circumference of the tube which forms the passage e, is a flange f. It will be noticed that the tube which provides the passage e does not extend quite to the top of the chamber C and that there is a space between the outer circumference of said tube and the inner circumference of the flange f, so that steam from the boiler may pass through the passage e, and thence through the space within the flange f, into the chamber C. From the bottom of the chamber C to the top of the separating-chamber B extends a pipe D. From the interior of the boiler A, up through the passage e, thence out through the top or side of the chamber C, thence downward to the top of the separating-tank B, is a pipe E. The diameter of the pipe E is less than the internal diameter of the passage e, so that a passage is afforded around the pipe E for the steam into the chamber C, as aforesaid. To the lower ends of the pipes D and E, respectively, are fitted pipes or tubes d d', which extend down into the chamber B to about the same distance as the tube c. The chamber C is provided with one or more feed-water inlets g, and the admission of the feed-water may be derived from any usual or suitable source, and is supplied into the chamber in the same manner that the feed-water is usually supplied to locomotives. The feed-water thus passed into the chamber C is subjected to the contact of the live steam from the boiler which passes into the said chamber through the passage e, &c., as above set forth. The feed-water being thus heated by steam in the chamber C passes down through the pipe D into the tank B or separating-chamber, where its impurities are deposited, and thence up through the tube c and the passage b into the boiler, where it mingles with the volume of water previously in said boiler. Meanwhile the water from the boiler at or near the temperature of steam produced in the latter circulates upward and then downward through the pipe E into the separating-chamber B, and thence up through the tube c and passage b again into the boiler, this circulation of water through the boiler and through the separating-chamber B being simultaneous with the introduction of the feed-water, as hereinbefore explained. The water thus circulated by means of the pipe E has substantially the same temperature as that which is in the boiler, and, mingling with the feed-water introduced into the tank B or separating-chamber, heats the latter to a temperature at which by the operation of well-understood laws the carbonate of lime, &c., is precipitated and deposited in the tank B, leaving the water in the purified condition to pass up into the boiler, as hereinbefore explained.

The circulation of the water by means of the pipe E also serves a simultaneous adjunctive purpose in this, that scum or mineral impurities which otherwise would remain upon the surface of the water in the boiler are carried by the circulating current into the separating-tank B, and are there deposited in connection with the calcareous or mineral deposits in the feed-water, so that by the means described the water in the boiler is kept in a continuously purified and clear condition favorable to the production of steam and practically avoiding the deposition of calcareous or mineral matter upon the inner surface of the boiler.

The downward projection into the separating-chamber B of the pipes or tubes c d d', as described, prevents the scum, oil, and other floating impurities from being returned to the boiler by the described circulation of the water. The tank or chamber B may be provided at or near its upper part with an outlet m, through which the scum, oil, and other impurities floating upon the surface of the water therein may be withdrawn, and at its lower part with an outlet n, through which the mud, sediment, &c., precipitated on the bottom of the separating-chamber may be withdrawn.

It will be observed that the inner portion of the pipe E, being passed up through the passage e, the steam which passes through the latter to the chamber C serves to heat said portion of said pipe and thereby promote the circulation, hereinbefore described, of the water through the said pipe from the boiler to the tank B.

For convenience in connecting the apparatus together a flange-casting a' may be riveted, as shown at a'', to the top of the tank B, with its face b' bolted to the corresponding face of a like casting c', coincidently bolted or riveted to the bottom of the boiler. With a like object the part of the tube which provides the passage e may be composed of a casting e', having a flange f', which is bolted or riveted to the top of the boiler, as indicated at f''. By these devices the tank B and chamber C, respectively, are firmly secured in place and position and in due relation with the boiler.

At the upper part of the pipe E is a float-valve S, carried by a buoyant float S' in a chamber T, which said valve closes upward against a seat m. (See Fig. 3.) When the apparatus has been disused, so that the pipes are filled with air, this valve drops. When the water rises in the pipe, the air will escape through the outlet n above the valve-seat until the water, having reached the top, carries the valve upward against the seat and thereby closes the outlet and directs the water into the pipe E, thereby initiating the circulation through said pipe. When desired, any other suitable valve or mechanism may be employed to eliminate the air from the pipe to permit the flow and circulation of the water, as described.

What we claim as our invention is—

1. The combination, with a steam-boiler, of the chamber B, placed below the same and communicating therewith by a passage b, the chamber C, placed above said boiler, the pipe D, extending from the bottom of the chamber C and communicating with the tank B, the pipe E, extending from the interior of the boiler through the chamber C and thence to the tank B, and a tube which provides a passage $e$ from the boiler to the chamber C, concentric with the inner portion of the pipe E, the whole arranged substantially as and for the purpose herein set forth.

2. The combination, with a steam-boiler, of the chamber B, placed below the same and communicating therewith by a passage $b$, the chamber C, placed above said boiler, the pipe D, extending from the bottom of the chamber C and communicating with the chamber B, the pipe $d$, extending downward from the top of the tank into the interior thereof, the pipe E, extending from the interior of the boiler through the chamber C and thence to the chamber B, and a tube which provides a passage $e$ from the boiler to the chamber C, concentric with the inner portion of the pipe E, the whole arranged substantially as and for the purpose herein set forth.

EDWD. S. TITUS.
FREDERICK W. WERNER.

Witnesses:
GEO. M. BROOKS,
CHARLES HERBERT.